Patented Jan. 21, 1930

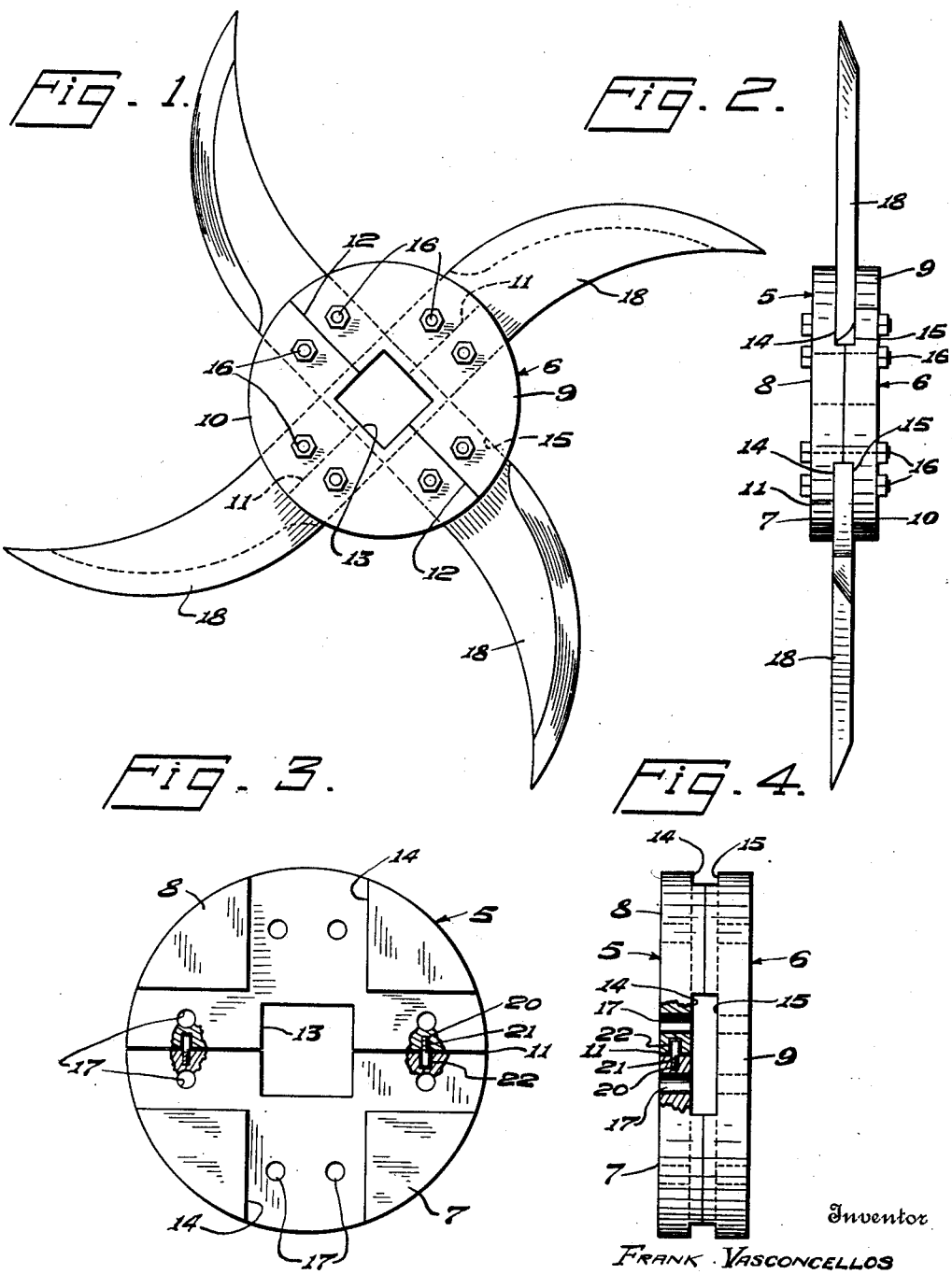

1,744,597

UNITED STATES PATENT OFFICE

FRANK VASCONCELLOS, OF PAIA, TERRITORY OF HAWAII

KNIFE-CARRYING HUB

Application filed May 8, 1928. Serial No. 276,169.

This invention relates to improvements in knife-carrying hubs, one object of the invention being the provision of a hub which is so constructed as to be easily placed upon and around a shaft either of cylindrical or irregular shape without the necessity of sliding the shaft through the hub, and whereby the knives or operating devices carried thereby can be renewed and replaced without the complete disassembling of the hub or removal of the shaft.

Another object of this invention is the provision of a device of this character which is especially adapted for use upon choppers and cultivators for pineapples and the like, and also for use in sugar-mills for chopping or cutting up the cane.

Still another object of this invention is the provision of a device of this character which is simple, durable and inexpensive in construction and thoroughly efficient and practical in use.

In the accompanying drawings:—

Figure 1 is a view in plan of the hub with four blades connected thereto;

Figure 2 is a view in side elevation thereof;

Figure 3 is a plan view taken from the inner side of one of the sections or members of the hub with portions broken away to show the position of the dowel pin connection between the same;

Figure 4 is a view in elevation of the complete hub per se with a portion broken away showing the dowel connection between two segments of one of the sections.

Referring to the drawings, the numeral 5 designates one member and 6 the second member of the present hub. The member 5 is composed of two semi-circular segments 7 and 8, while the member 6 is composed of two similarly shaped sections or segments 9 and 10. These respective segments 7 and 8 and 9 and 10 are connected together on diametrical lines 11 and 12, respectively, and such diametrical lines are quartered, as viewed in Figure 1, so that the meeting edges will be out of alinement. The two disks 5 and 6 are here shown as provided with an irregularly shaped shaft receiving opening 13 which, however, may be circular, in which event, a keyway will be employed, the members being so constructed that they can be assembled about the shaft without the necessity of threading the shaft therethrough, thus permitting the same to be assembled at any point without removing the shaft, and especially adapting the present device for various uses where a series of hubs or tool-carrying members are employed upon a single shaft side by side, the present device being particularly designed for use with a pineapple chopper and cultivator, as shown in my co-pending application, filed December 28, 1927, Serial No. 243,185, wherein it is desired to place disks between the said hubs as spacing members and arrange the hubs so that the same may be readily taken apart and assembled for attaching the respective blades 18.

Upon the inner faces of the respective disks 5 and 6 are provided cruciform recesses 14 and 15, respectively, the shape of the recesses being particularly illustrated in Figure 3, wherein certain thereof are divided centrally through the disk, while in order to clamp the said sections 5 and 6 together the bolts 16 are employed, the same passing through the apertures 17 of the respective disks and also through the base of the knives 18.

It will thus be seen that to disassemble the present device it is only necessary to remove the bolts and all four of the segments composing the complete hub can be removed from the shaft, or, if so desired, when it is only necessary to replace a blade, two of the bolts are removed and the blade is then withdrawn from the recess or socket formed by the cruciform recesses upon the opposed faces of the disks 5 and 6.

As shown in Figures 3 and 4, in order to prevent diametrical movement between the respective segments of each of the disks, a threaded opening or socket 20 is provided in one segment and carries the dowel pin 21 which is adapted to fit in the socket 22 of the adjacent segment. Thus it requires a straight line movement to separate these members and the dowel pins acting as a steadying and holding means during the assembling of the sections and before the fastening thereof with the bolts 17.

From the foregoing description, taken in connection with the drawings, it is evident that with a device of this character the respective disks reinforce one another, are held together by the bolts 16, which, in turn, act as a clamping and holding means for securing the blades or other implements to and within the hub, and that by this construction the hub can be readily attached to either an irregular or cylindrical shaft without the disassembling of the shaft or the threading of the shaft through the opening of the hub, as is the usual practice.

What is claimed is:—

1. A hub including two circular disks, each one of which consists of two semi-circular segments, each disk being provided with a cruciform recess upon the inner face thereof, said disks being mated so that the meeting edges of the segments of one disk quarters with relation to those of the other disk, and fastening devices passing through both disks adjacent the recesses thereof to form with the recesses holding means for removable blades or the like and also to clamp the disks together.

2. A hub including two circular disks, each one of which consists of two semi-circular segments, each disk being provided with a cruciform recess upon the inner face thereof, said disks being mated so that the meeting edges of the segments of one disk quarters with relation to those of the other disk, fastening devices passing through both disks adjacent the recesses thereof to form with the recesses holding means for removable blades or the like and also to clamp the disks together, and means disposed between the adjacent faces of each pair of segments to hold the segments against diametrical movement.

3. A hub including two circular disks, each one of which consists of two semi-circular segments, each disk being provided with a cruciform recess upon the inner face thereof, said disks being mated so that the meeting edges of the segments of one disk quarters with relation to those of the other disk, fastening devices passing through both disks adjacent the recesses thereof to form with the recesses holding means for removable blades or the like and also to clamp the disks together, and dowel pin connections between the meeting edges of each pair of segments.

4. A cutter-carrying hub including two circular disks each one of which consists of two semi-circular segments, each disk being provided with a cruciform recess upon the inner face thereof and said disks being mated so that said recesses coincide while the meeting edges of the segments are at right angles relatively to each other, said recesses being open through the periphery of the hub, a blade insertable in each one of said recesses, and two bolts piercing each blade and the adjacent portions of the disks to lock the blade within its recesses and to clamp the segments relatively to each other.

5. A cutter-carrying hub including two circular disks each one of which consists of two semi-circular segments, each disk being provided with a cruciform recess upon the inner face thereof and said disks being mated so that said recesses coincide while the meeting edges of the segments are at right angles relatively to each other, said recesses being open through the periphery of the hub, a blade insertable in each one of said recesses, two bolts piercing each blade and the adjacent portion of the disks to lock the blade within its recess and to clamp the segments relatively to each other, and means disposed between the adjacent faces of each pair of segments to hold the segments against diametrical movement.

6. A cutter-carrying hub including two circular disks each one of which consists of two semi-circular segments, each disk being provided with a cruciform recess upon the inner face thereof and said disks being mated so that said recesses coincide while the meeting edges of the segments are at right angles relatively to each other, said recesses being open through the periphery of the hub, a blade insertable in each one of said recesses, two bolts piercing each blade and the adjacent portion of the disks to lock the blade within its recess and to clamp the segments relatively to each other, and a plurality of socket and dowel pin connecting media disposed between the adjacent faces of the segments of each disk.

In testimony whereof I have hereunto set my hand.

FRANK VASCONCELLOS.